United States Patent
Jang et al.

(10) Patent No.: US 10,935,199 B2
(45) Date of Patent: Mar. 2, 2021

(54) LIGHTING DEVICE HAVING NON-PLANAR DIFFUSER WITH ARRAY OF 3D ELEMENTS

(71) Applicant: LG INNOTEK CO., LTD., Seoul (KR)

(72) Inventors: Jae Hyuk Jang, Seoul (KR); Jin Su Kim, Seoul (KR); Seung Jong Baek, Seoul (KR); Dong Hyun Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/456,171

(22) Filed: Jun. 28, 2019

(65) Prior Publication Data

US 2019/0317269 A1     Oct. 17, 2019

Related U.S. Application Data

(63) Continuation of application No. 15/634,854, filed on Jun. 27, 2017, now Pat. No. 10,379,283, which is a
(Continued)

(30) Foreign Application Priority Data

Jun. 2, 2014   (KR) .................. 10-2014-0067055

(51) Int. Cl.
*F21V 5/02* (2006.01)
*G02B 5/02* (2006.01)
(Continued)

(52) U.S. Cl.
CPC .......... *F21S 10/005* (2013.01); *F21S 43/239* (2018.01); *F21S 43/245* (2018.01); *F21S 43/26* (2018.01);
(Continued)

(58) Field of Classification Search
CPC . F21V 5/004; F21V 5/005; F21V 5/02; G02B 5/0231; G02B 5/045
See application file for complete search history.

(56) References Cited

U.S. PATENT DOCUMENTS 593,045 A    11/1897  Cummings et al.
1,241,886 A  10/1917  Rowe
(Continued)

FOREIGN PATENT DOCUMENTS

CN    1570721      1/2005
CN    1016143638   12/2009
(Continued)

OTHER PUBLICATIONS

U.S. Office Action issued in grandparent U.S. Appl. No. 14/726,773 dated Nov. 18, 2016.
(Continued)

*Primary Examiner* — Ismael Negron
(74) *Attorney, Agent, or Firm* — KED & Associates LLP

(57) ABSTRACT

A light device includes a light guide member having first, second and third portions. An array of light-modifying elements are formed on one main surface of the light guide member, and each light-modifying element having surfaces inclined with respect to at least one of the main surfaces of the light guide member. The light-modifying elements are configured to diffuse incident light. A light source (or light sources) is provided on a substrate, and configured to project light along a thickness direction of the light guide member. The first and third portions of the light guide member are provided at different distances from the substrate, with the second portion being inclined to an acute angle with respect to the substrate.

17 Claims, 8 Drawing Sheets

Related U.S. Application Data continuation of application No. 14/726,773, filed on Jun. 1, 2015, now Pat. No. 9,733,417.

(51) Int. Cl.

| | | |
|---|---|---|
| *F21S 10/00* | (2006.01) | |
| *F21V 8/00* | (2006.01) | |
| *F21S 43/20* | (2018.01) | |
| *F21S 43/245* | (2018.01) | |
| *F21S 43/239* | (2018.01) | |
| *G02B 30/36* | (2020.01) | |
| *F21V 5/04* | (2006.01) | |
| *F21Y 105/00* | (2016.01) | |
| *F21Y 115/15* | (2016.01) | |
| *F21Y 115/10* | (2016.01) | |
| *B60Q 3/64* | (2017.01) | |
| *F21V 33/00* | (2006.01) | |

(52) U.S. Cl.
CPC .............. *F21V 5/04* (2013.01); *G02B 6/0036* (2013.01); *G02B 6/0065* (2013.01); *G02B 6/0068* (2013.01); *G02B 6/0073* (2013.01); *G02B 30/36* (2020.01); *B60Q 3/64* (2017.02); *F21V 33/006* (2013.01); *F21Y 2105/00* (2013.01); *F21Y 2115/10* (2016.08); *F21Y 2115/15* (2016.08)

(56) References Cited

U.S. PATENT DOCUMENTS

| | | | | |
|---|---|---|---|---|
| 4,816,968 A | * | 3/1989 | Yamada | ................... B60Q 1/28 362/268 |
| 5,220,462 A | | 6/1993 | Feldman, Jr. | |
| 5,839,823 A | | 11/1998 | Hou | |
| 6,097,549 A | * | 8/2000 | Jenkins | .................. B60Q 1/302 359/726 |
| 6,305,813 B1 | * | 10/2001 | Lekson | .................. B60Q 1/302 362/625 |
| 7,199,930 B2 | | 4/2007 | Yao | |
| 7,290,906 B2 | * | 11/2007 | Suzuki | ................. B60Q 1/2696 362/511 |
| 7,438,459 B2 | | 10/2008 | Hwang | |
| 7,489,373 B2 | | 2/2009 | Kim | |
| 7,690,810 B2 | | 4/2010 | Saitoh | |
| 7,806,580 B2 | | 10/2010 | Lin | |
| 7,862,192 B2 | | 1/2011 | Chang | |
| 8,152,339 B2 | * | 4/2012 | Morgan | ................... F21S 11/00 362/336 |
| 8,272,773 B2 | | 9/2012 | Nakagome et al. | |
| 8,328,403 B1 | | 12/2012 | Morgan | |
| 8,434,892 B2 | * | 5/2013 | Zwak | ................... G02B 6/0018 362/235 |
| 8,500,319 B2 | | 8/2013 | Wang He | |
| 8,657,467 B2 | * | 2/2014 | Hsieh | ................. G02B 19/0071 362/240 |
| 9,010,982 B2 | * | 4/2015 | Kropac | ................ G02B 6/0018 362/23.01 |
| 9,291,320 B2 | * | 3/2016 | Durkee | ................ G02B 6/0046 |
| 9,366,799 B2 | * | 6/2016 | Wilcox | .................... F21S 8/061 |
| 9,651,740 B2 | * | 5/2017 | Tarsa | ....................... G02B 6/34 |
| 10,024,521 B2 | * | 7/2018 | Ebner | ....................... F21V 5/00 |
| 10,209,429 B2 | * | 2/2019 | van de Ven | .......... G02B 6/0078 |
| 2010/0165634 A1 | | 7/2010 | Hong | |
| 2013/0335975 A1 | | 12/2013 | Park et al. | |
| 2014/0133128 A1 | | 5/2014 | Oh | |

FOREIGN PATENT DOCUMENTS

| | | |
|---|---|---|
| CN | 102809090 | 12/2012 |
| CN | 103574350 | 2/2014 |
| CN | 103574355 | 2/2014 |
| CN | 103728769 | 4/2014 |
| JP | H 08241604 | 9/1996 |
| JP | 2002-319304 A | 10/2002 |
| JP | 2005-322549 | 11/2005 |
| JP | 2011-249047 | 12/2011 |
| JP | 2013-179092 | 9/2013 |
| KR | 10-1997-0037335 | 7/1997 |
| KR | 10-1182261 B1 | 9/2012 |
| KR | 10-2013-0102715 | 9/2013 |

OTHER PUBLICATIONS

U.S. Office Action issued in parent U.S. Appl. No. 15/634,854 dated Oct. 11, 2018.
Chinese Office Action dated Sep. 13, 2018 issued in Application No. 201580025155.3 (English Translation Attached).
Chinese Office Action dated Sep. 29, 2018 issued in Application No. 201580029696.3 (English Translation Attached).
U.S. Notice of Allowance issued in parent U.S. Appl. No. 15/634,854 dated Mar. 28, 2019.
Korean Office Action dated May 28, 2020 issued in Application 10-2014-0067055.

* cited by examiner

[FIG. 1]
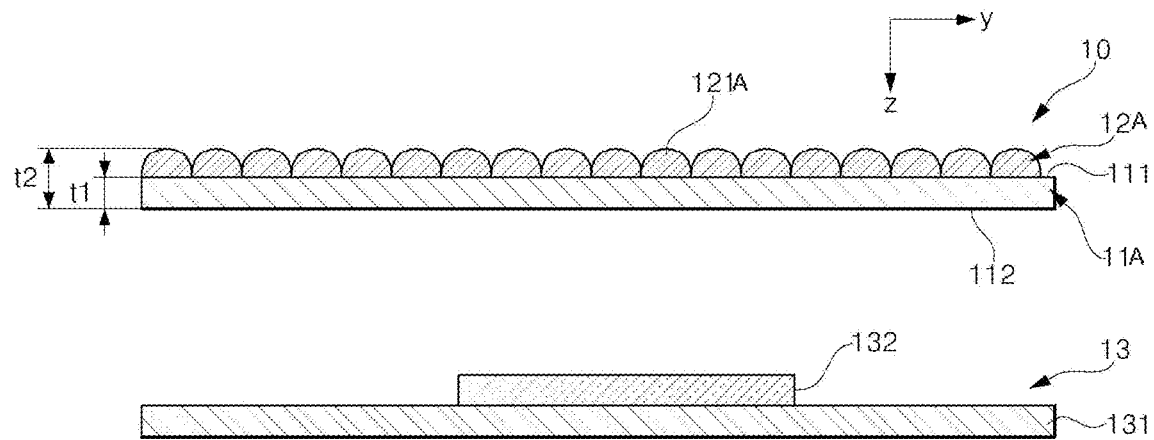
[FIG. 2]
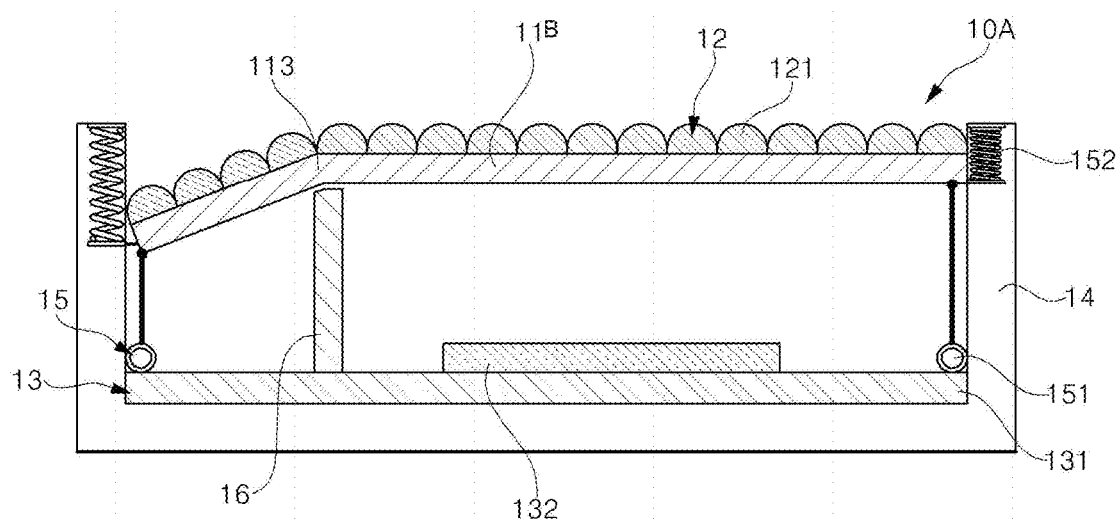

[FIG. 3]
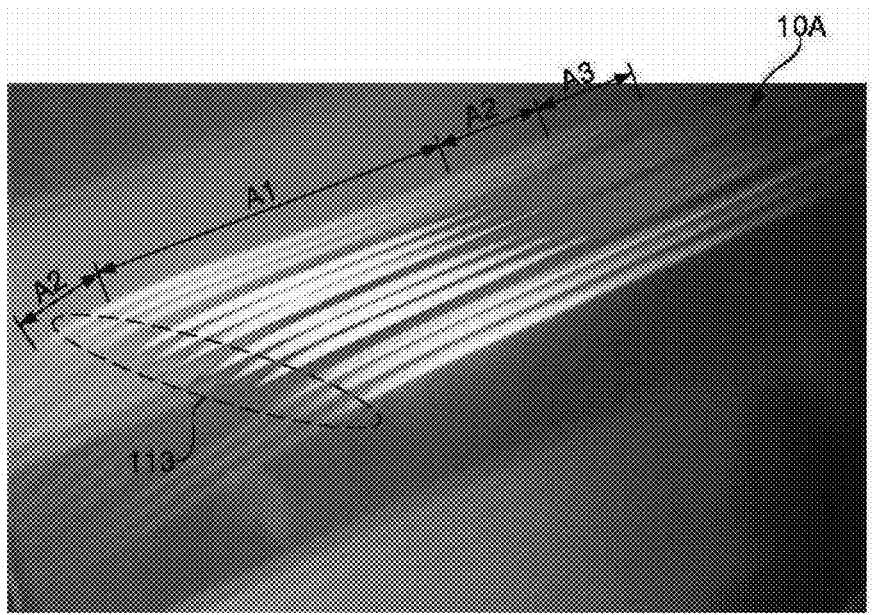
[FIG. 4]
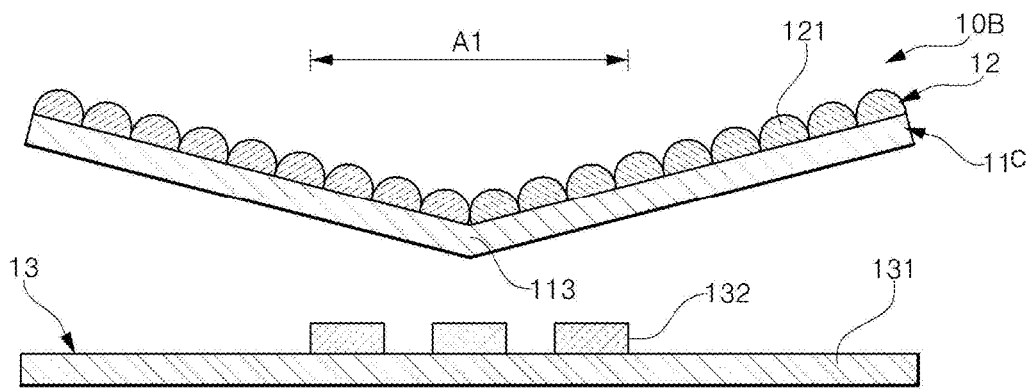

[FIG. 5]
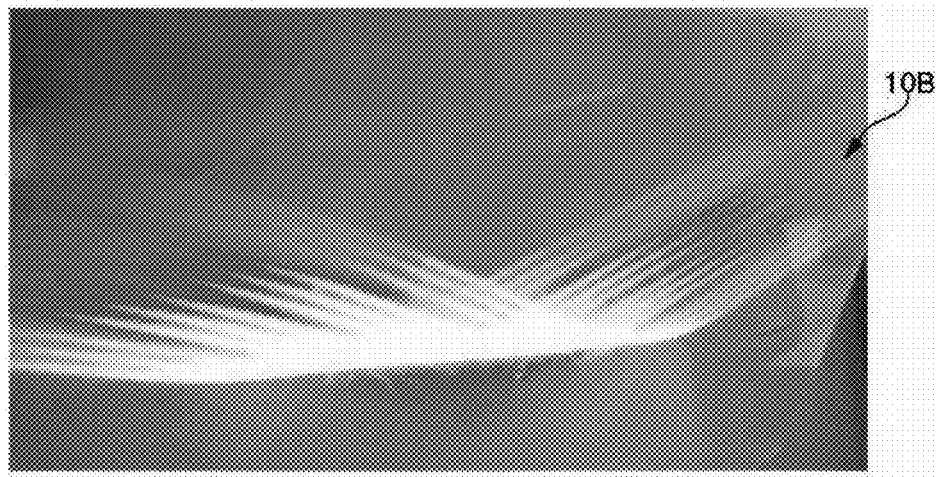
[FIG. 6]
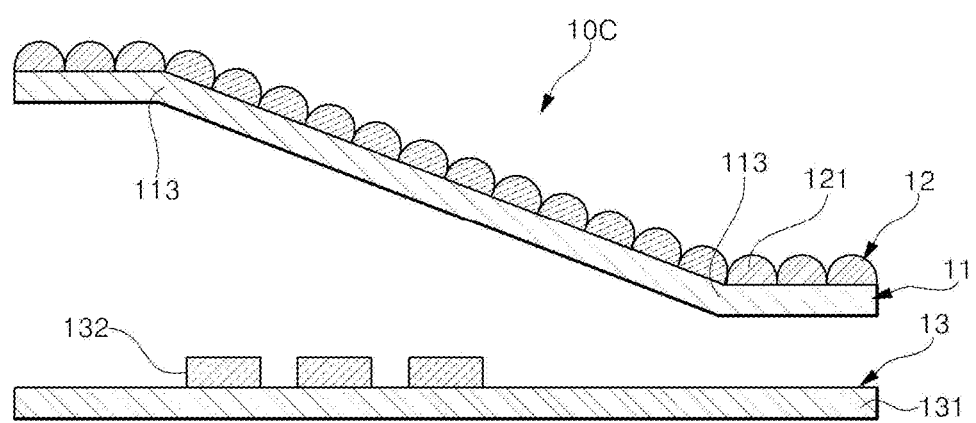

[FIG. 7]
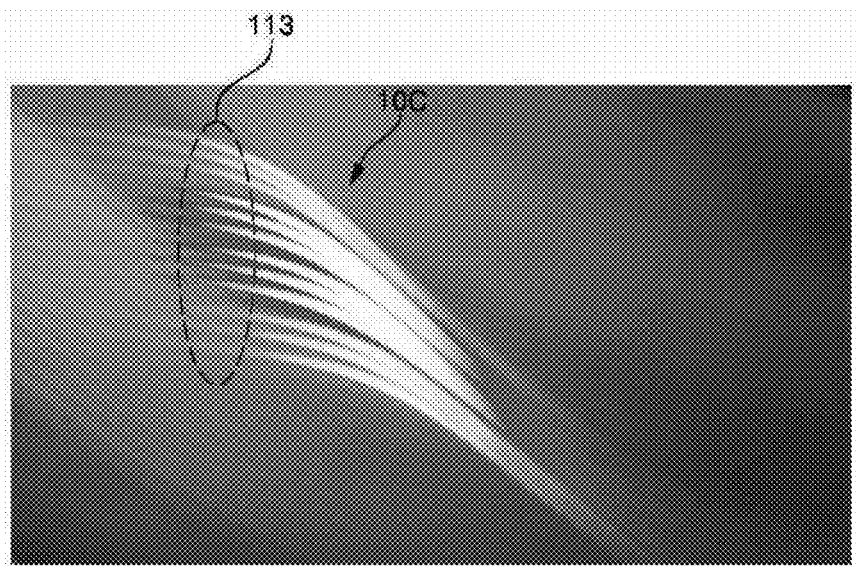
[FIG. 8]
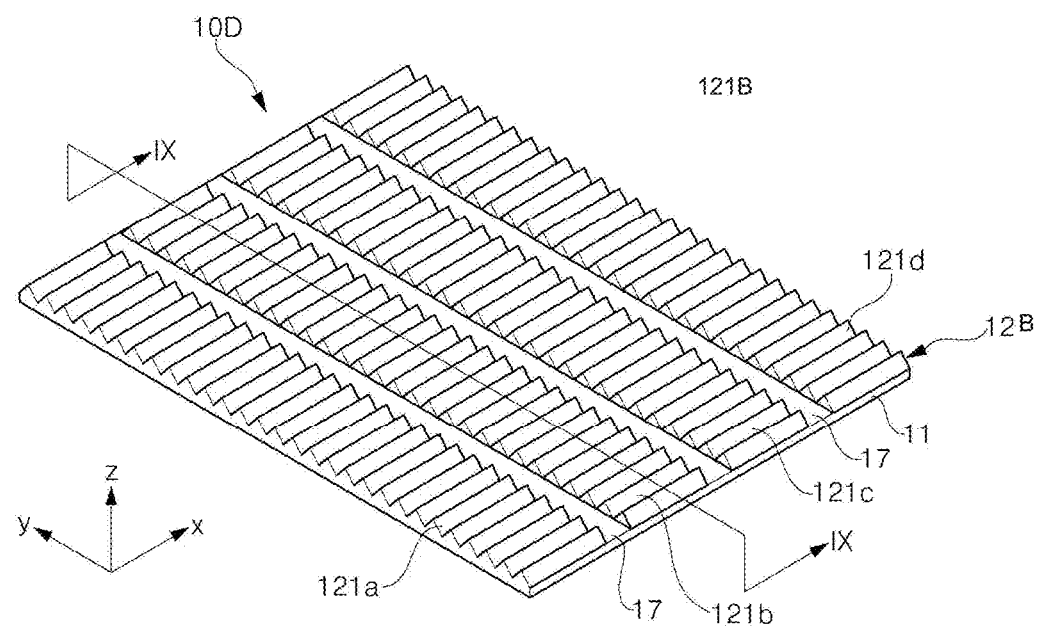

[FIG. 9]
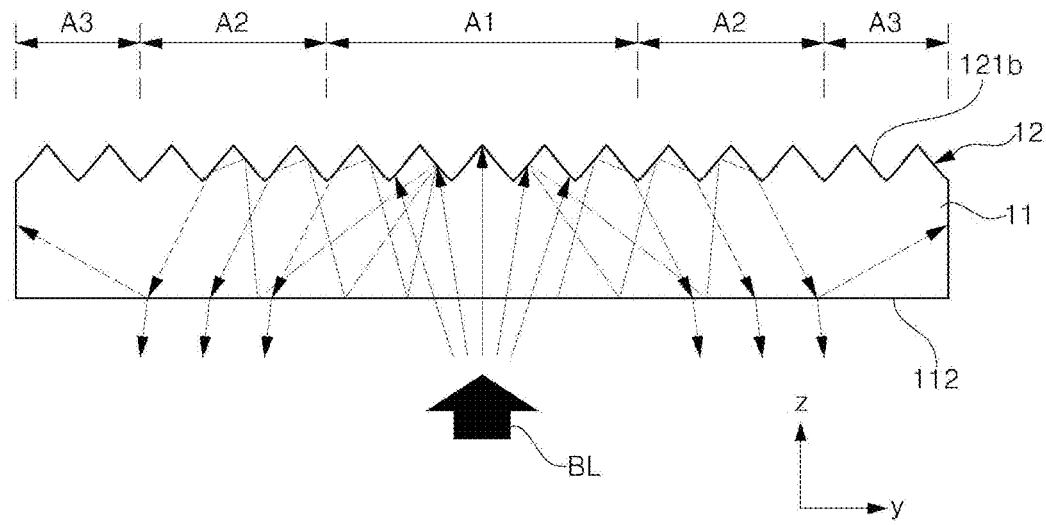
[FIG. 10]
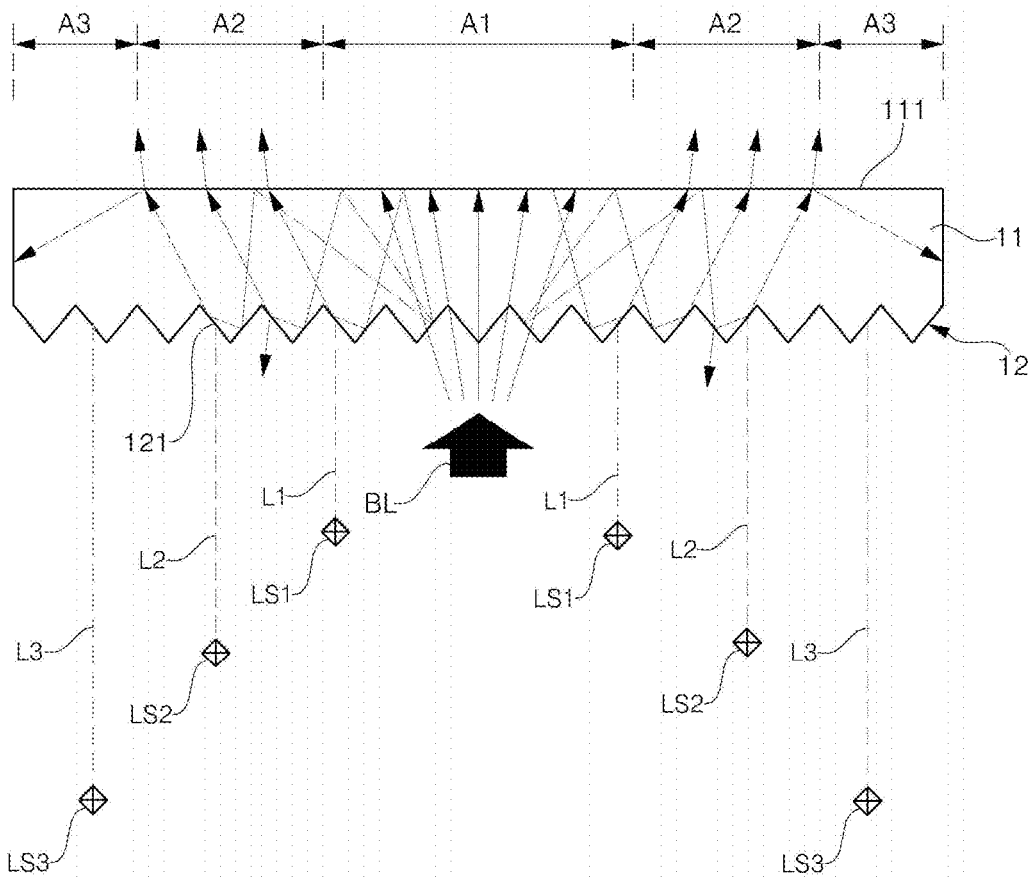

[FIG. 11]
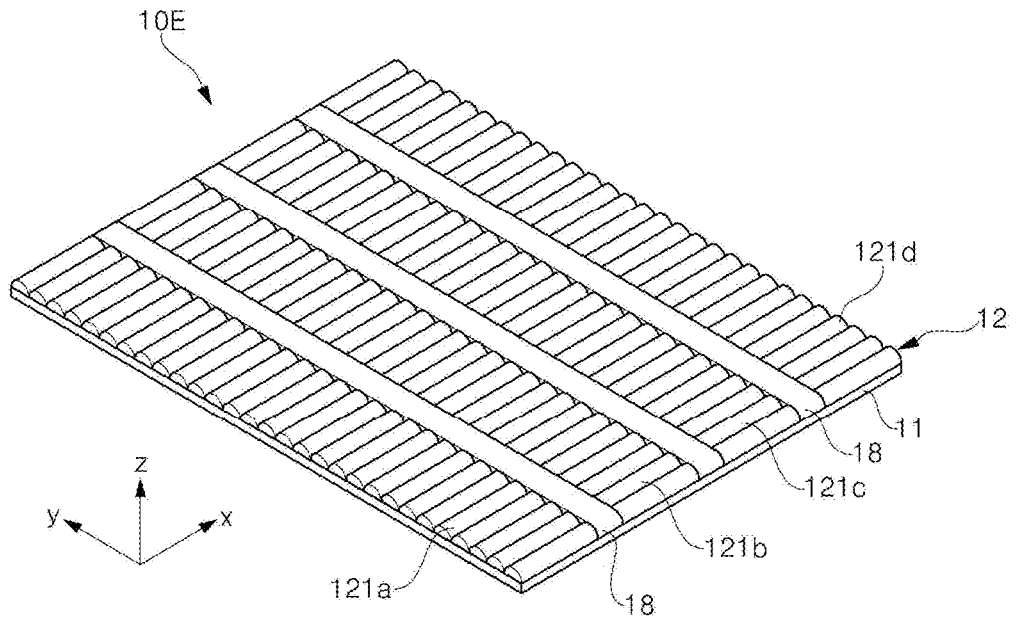
[FIG. 12]
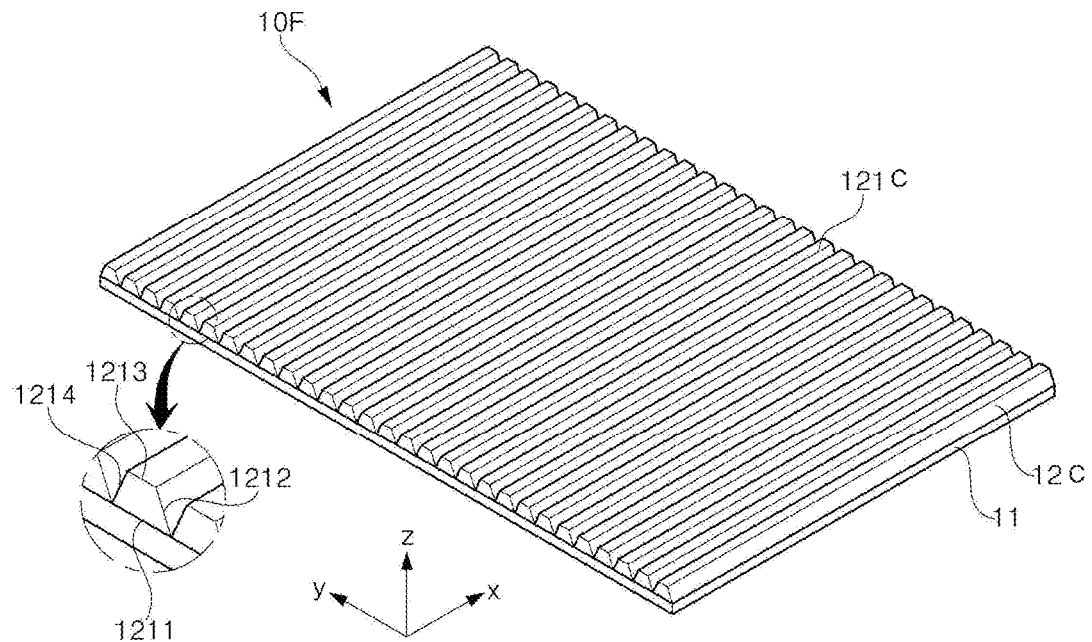

[FIG. 13]
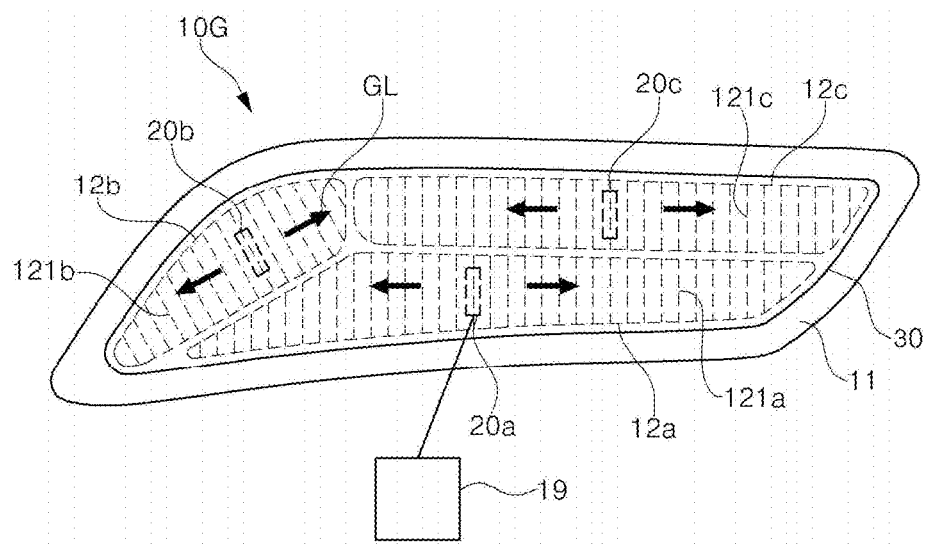
[FIG. 14]
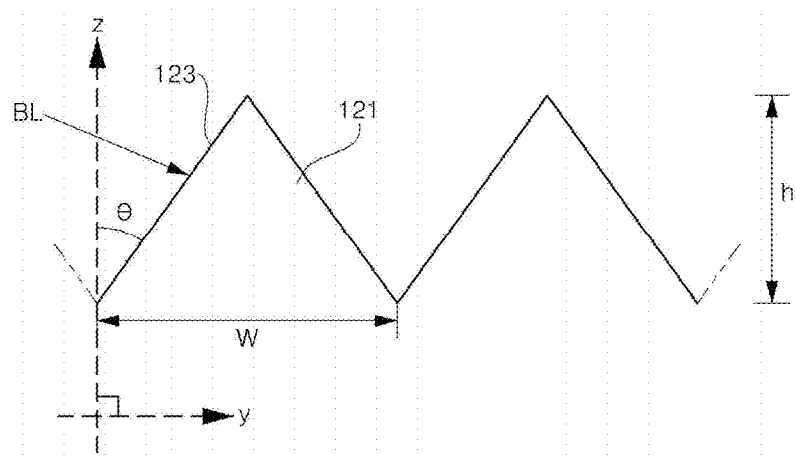

[FIG. 15]
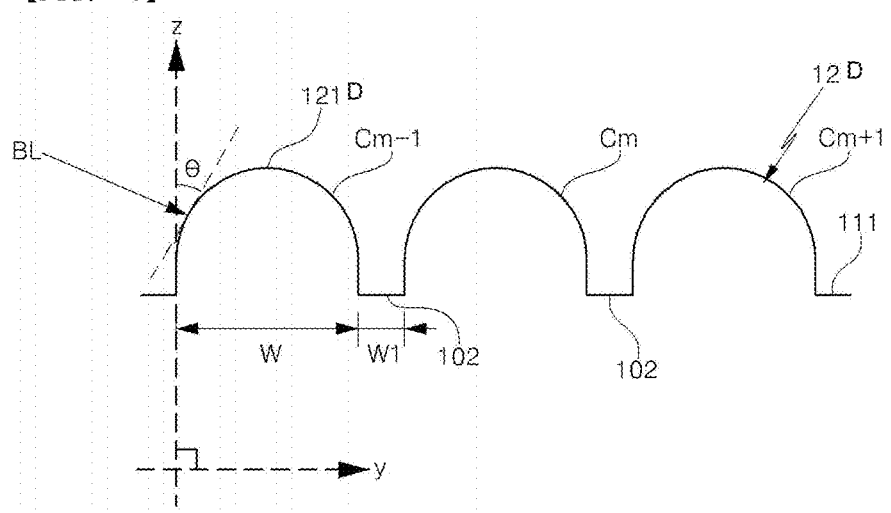
[FIG. 16]
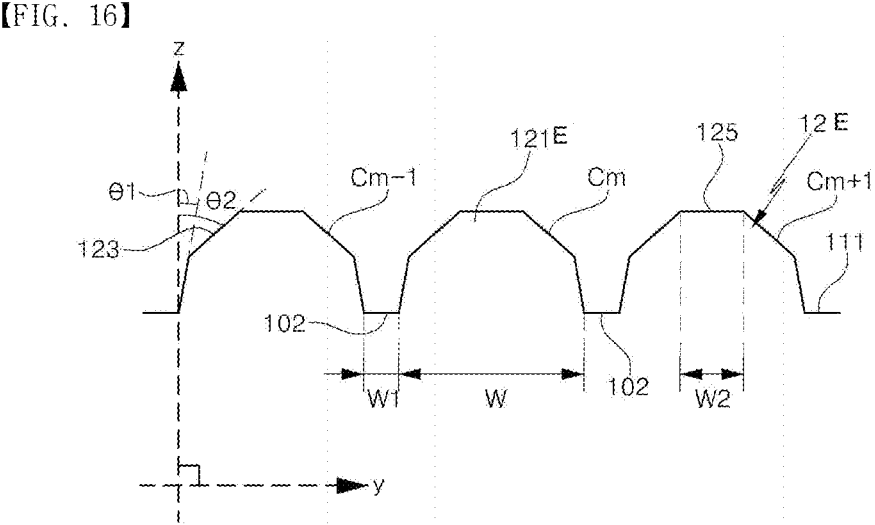

LIGHTING DEVICE HAVING NON-PLANAR DIFFUSER WITH ARRAY OF 3D ELEMENTS

CROSS-REFERENCE TO RELATED APPLICATION

This application is a Continuation Application of U.S. patent application Ser. No. 15/634,854, filed on Jun. 27, 2017, which is a Continuation Application of U.S. patent application Ser. No. 14/726,773, filed on Jun. 1, 2015, which claims priority under 35 U.S.C. § 119 to Korean Application No. 10-2014-0067055, filed on Jun. 2, 2014, in the Korean Intellectual Property Office, whose entire disclosures are hereby incorporated by reference.

BACKGROUND

1. Field

Embodiments of the present disclosure relate to a lighting device, and more specifically, a lighting device capable of implementing line shaped beams having desired shapes through a pattern design and an arrangement structure of a light source for patterns.

2. Background

In general, a lighting device is a device used for lightening a dark place using various light sources. The lighting device is used to shine a beam to a specific object or space and to express an atmosphere of the specific object or space in a desired shape or color.

According to the technical development of an LED (Light Emitting Diode), lighting devices in various shapes using the LED have recently come into wide use. For example, one of the lighting devices according to a conventional art includes a diffusion plate for emitting light emitted from an LED light source to the outside.

Most of the LED lighting devices according to the conventional art are configured so that light is uniformly outputted on an entire light emitting surface. Also, in order to express the atmosphere of a specific object or space in a desired shape or color, a color filter or a filter having a light permeable hole in a desired shape has been used in some lighting devices according to the conventional art.

However, when the atmosphere of a specific object or space is expressed in a desired shape or color using the LED lighting devices according to the conventional art, the configuration of the devices becomes mechanically complicated, and as a result, it is problematic in that the degree of freedom in design is limited, and it is difficult to install or maintain and manage the devices. As such, in order to express an optical image with a desired shape or mood, a lighting device having a simple structure, which is easy to produce and install, has been required.

BRIEF DESCRIPTION OF THE DRAWINGS

The embodiments will be described in detail with reference to the following drawings in which like reference numerals refer to like elements wherein:

FIG. 1 is a cross-sectional view of a lighting device according to one embodiment of the present disclosure;

FIG. 2 is a cross-sectional view of a lighting device according to another embodiment of the present disclosure;

FIG. 3 is an exemplary view showing an optical image of the lighting device of FIG. 2;

FIG. 4 is a cross-sectional view of a lighting device according to still another embodiment of the present disclosure;

FIG. 5 is an exemplary view showing an optical image of the lighting device of FIG. 4;

FIG. 6 is a cross-sectional view of a lighting device according to still anther embodiment of the present disclosure;

FIG. 7 is an exemplary view showing an optical image of the lighting device of FIG. 6;

FIG. 8 is a partially perspective view of a lighting device according to still another embodiment of the present disclosure;

FIG. 9 is a partially cross-sectional view taken along line IX-IX of the lighting device of FIG. 8;

FIG. 10 is a cross-sectional view illustrated for explaining an operating principle of the lighting device of FIG. 8;

FIG. 11 is a perspective view of a lighting device according to still another embodiment of the present disclosure;

FIG. 12 is a perspective view of a lighting device according to still another embodiment of the present disclosure;

FIG. 13 is a schematic view of a lighting device according to still another embodiment of the present disclosure; and FIGS. 14 to 16 are exemplary views showing patterns which can be adopted to the lighting device of the present disclosure.

DETAILED DESCRIPTION

The present disclosure may refer to various elements of a lighting device including a light guide part, a three-dimensional effect forming part and a unit pattern. Other elements may also be described with respect to the lighting device.

The disclosure and figures may relate to a light guide part 11 as having different shapes and/or arrangements. For example, FIG. 1 may relate to the light guide part 11A as having a flat substrate, FIG. 2 may relate to the light guide part 11B as having a bent substrate at one side, and FIG. 4 may relate to the light guide part 11C as having a bent substrate at substantially the center.

As used hereinafter, the light guide parts 11A, 11B, 11C and other variations shown in the figures or the disclosure may collectively be referred to as the light guide part 11.

The disclosure and figures may relate to a three-dimensional effect forming part 12 as having different shapes and/or arrangements. For example, FIG. 1 may relate to the three-dimensional effect forming part 12A as having an array of substantially hemispherical elements, FIG. 8 may relate to the three-dimensional effect forming part 12B as having full triangular elements, FIG. 12 may relate to the three-dimensional effect forming part 12C as having truncated triangular elements, FIG. 15 may relate to the three-dimensional effect forming part 12D as having elongated hemispherical elements, and FIG. 16 may relate to the three-dimensional effect forming part 12E as having polygonal elements.

As used hereinafter, the three-dimensional effect forming parts 12A, 12B, 12C, 12D, 12E and other variations shown in the figures or the disclosure may collectively be referred to as the three-dimensional effect forming part 12.

The disclosure and figures may relate to a unit pattern 121 as having different shapes and/or arrangements. For example, FIG. 1 may relate to the unit pattern 121A as having substantially hemispherical elements, FIG. 8 may relate to the unit pattern 121B as having full triangular elements, FIG. 12 may relate to the unit pattern 121C as having truncated triangular elements, FIG. 15 may relate to the unit pattern 121D as having elongated hemispherical elements, and FIG. 16 may relate to the unit pattern 121E as having polygonal elements.

As used hereinafter, the unit patterns 121A, 121B, 121C, 121D, 121E and other variations shown in the figures or the disclosure may collectively be referred to as the unit pattern 121.

Hereinafter, the embodiments of the present disclosure that an ordinary person skilled in the art can implement will be described with reference to the accompanying drawings. The embodiments in the specification and the constructions shown in the drawings are provided as a preferred embodiment of the present disclosure, and it should be understood that there may be various equivalents and modifications which could substitute at the time of filing. In addition, when it comes to the operation principle of the preferred embodiments of the present disclosure, when the known functions or functions are seemed to make unclear the subject matters of the present disclosure, they will be omitted from the descriptions of the disclosure. The terms below are defined in consideration of the functions of the present disclosure, and the meaning of each term should be interpreted by judging the whole parts of the present specification, and the elements having the similar functions and operations of the drawings are given the same reference numerals. As used herein, the singular forms are intended to include the plural forms as well, unless the context clearly indicates otherwise.

FIG. 1 is a cross-sectional view of a lighting device according to one embodiment of the present disclosure;

Referring to FIG. 1, a lighting device 10 according to the present embodiment includes: a light guide part 11; a three-dimensional effect forming part 12; and a light source part 13. Here, the three-dimensional effect forming part 12 converts an incident beam irradiated from the light source part 13 to the inside of the light guide part 11 into a line-shaped beam with a three-dimensional effect. A combination of the three-dimensional effect forming part 12 and the light guide part 11 may correspond to an optical member for implementing a line-shaped beam by converting an incident beam of the light source part 13.

The light guide part 11 has a plate or film form and moves the incident beam from one side to the other side in an inner portion. The light guide part 11 is a member for preparing the three-dimensional effect forming part 12, or a member for supporting the three-dimensional effect forming part 12.

Resin or glass may be used as a material of the light guide part 11, wherein the resin may include a thermoplastic polymer or a photo curable polymer. Also, polycarbonate, polymethylmethacrylate, polystyrene, polyethylene terephthalate, and the like may be used as a material of the light guide part 11, but the material of the light guide part is not limited to these materials.

Also, the material of the light guide part 11 may be a UV curable resin containing an oligomer, more specifically, a resin containing a urethane acrylate oligomer as a main raw material. That is, the resin in which the urethane acrylate oligomer corresponding to a synthetic oligomer, and a polyacrylic polymer are mixed may be used. Of course, a monomer in which IBOA (isobornyl acrylate), HPA (hydroxylpropyl acrylate), 2-HEA (2-hydroxyethyl acrylate) and the like are mixed may be further included, wherein the monomer corresponds to a low boiling point and diluted type reactive monomer. Furthermore, a photo initiator (1-hydroxycyclohexyl phenyl-ketone and the like) or an antioxidant may be further mixed as an additive. However, this is only one example, and the light guide part 11 may be provided using appropriate resin that has been developed and commercialized, or can be implemented according to future technical development, and can perform a light guiding function.

A thickness t1 of the light guide part 11 may be about 0.1 mm or more and about 10.0 mm or less. When the thickness t1 is smaller than 0.1 mm, it is difficult to property implement a line-shaped beam with a three-dimensional effect. Also, when the thickness t1 is larger than 10.0 mm, it is disadvantageous in that the lighting device having a plate form becomes thick and is inconvenience for handling, and the cost of materials is increased.

According to some embodiments, the thickness t1 of the light guide part 11 may be about 100 μm or more and about 250 μm or less. In such a case, since the light guide part 11 has a thin film form, it can be wound on a roll or can be easily applied to an application product having a bent portion. Also, according to some embodiments, the thickness t1 of the light guide part 11 may be about 250 μm or more and about 10.0 mm or less. In this case, since the light guide part 11 has a plate form, it cannot be wound on a roll and the like, or can be easily applied to the flat portion of an application product.

A thickness t2 of an optical member of the lighting device 10 may result from adding a thickness of the three-dimensional effect forming part 12 to the thickness t1 of the light guide part 11. The thickness of the three-dimensional effect forming part 12 may be several μm to tens of μm. Of course, according to some embodiments, when the three-dimensional effect forming part 12 is integrally formed with the light guide part 11 by processing a first surface 111 of the light guide part 11, The thickness t2 of the optical member including the light guide part 11 and the three-dimensional effect forming part 12 may be identical to the thickness t1 of the light guide part 11.

The three-dimensional effect forming part 12 include a pattern sequentially arranged on the first surface 111. The pattern may be referred to as an optical pattern. The pattern has multiple unit patterns 121. The unit patterns 121 reflect or refract incident beams traveling in the optical member from each inclined surface of the unit patterns and guide the beams to a first surface direction toward which the first surface 111 of the light guide part 11 looks, or a second surface direction toward which a second surface 112 looks so that the beams can extend to first paths crossing at right angles to each pattern extension direction of the unit patterns, thereby creating line-shaped beams.

In particular, the three-dimensional effect forming part 12 of the present embodiment converts the incident beam irradiated from an intermediate portion of the light guide part 11 into a first line-shaped beam extending from the intermediate portion of the light guide part 11 to a first side edge of the light guide part 11, and a second line-shaped beam extending from the intermediate portion of the light guide part 11 to a second side edge facing the first side edge or located opposite to the first side edge.

Each unit pattern 121 may have approximately a triangular shape, a semicircular shape, or a polygonal section shape such as a pentagonal shape and the like. In the present embodiment, each unit pattern 121 of the three-dimensional effect forming part 12 has a cylindrical shape with a semi-circle-shaped section. Thus, the three-dimensional effect forming part 12, or the pattern thereof may have an uneven structure in which the multiple unit patterns with a semicircular pillar-like shape are sequentially arranged in a stripe form. In addition to the structure in which the three-dimensional effect forming part 12 or the pattern thereof are integrally formed with the light guide part 11 by processing one surface of the light guide part 11, the three-dimensional effect forming part 12 or the pattern thereof may be also provided in such a manner that a separate pattern layer is attached to one surface of the light guide part 11.

The three-dimensional effect forming part 12 may be made of a material with a refractive index that is identical to that of the light guide part 11, or a refractive index having a slight difference (0.2 or less) with the refractive index of the light guide part 11. The three-dimensional effect forming part 12 may be provided using a thermoplastic polymer, a photo curable polymer, and the like.

In order to obtain a desired reflection and refraction ability from the inclined surface of the pattern 121 of the three-dimensional effect forming part 12, each inclined surface of the unit patterns 121 may be a mirror surface, a mirror-like finishing surface, or a precise machining surface. A roughness of the inclined surface may be measured through a standard roughness Rz, and the like. In the present embodiment, the standard roughness of the inclined surface may be about 0.8 µm or less based on a standard length of 0.25 mm.

The light source part 13 irradiates light from the intermediate portion of the light guide part 11. That is, the light source part 13 is disposed to irradiate the light in a thickness direction (z-direction) of the light guide part 11. A distance between the light source part 13 and the second surface 112 of the light guide part 11 may be appropriately adjusted according to intensity of the light irradiated by the light source part 13, or according to a desired length of a line-shaped beam. Also, a distance between the light source part 13 and the light guide part 11 may be designed according to a space allowed for an application product to which the lighting device is adopted. This distance may be designed to be variable.

The light source part 13 may be configured to include an artificial light source, such as a candle, an incandescent lamp, a discharge lamp, a halogen lamp, an LED (Light Emitting Diode) lamp, an OLED (Organic Light Emitting Diode) lamp, and the like. Also, the light source part 13 may include a natural light source, such as the light of the sun. In this case, the light source part 13 may include a guide member for guiding or reflecting the light of the sun, and a light exit hole (not drawn) for irradiating an incident beam toward the light guide part 11. The light exit hole may be provided at a position in which an LED light source 132 is located. Hereinafter, in the embodiments, for example, an LED light source having advantages, such as low power consumption, a long lifespan, a mercury-free operation and the like, will be described as a light source of the light source part 13.

When the LED light source is included, the light source part 13 includes: a substrate 131; and the LED light source 132 mounted to the substrate 131 and including at least one LED element. The substrate 131 may be a printed circuit board and may include a driving circuit or a driving chip mounted to the printed circuit board, and the LED light source 132 may include an LED package. The printed circuit board may be a flexible printed circuit board.

When a resin layer is used as the light guide part 11, and a flexible printed circuit board is used as the printed circuit board, the flexible light device 10 with a thin sheet form may be implemented.

Meanwhile, according to the lighting device of the present embodiment, it is explained that the three-dimensional effect forming part 12 is disposed on the first surface 111 of the light guide part 11, but the present disclosure is not limited thereto. According to some embodiments, the three-dimensional effect forming part 12 may be disposed on the second surface 112 of the light guide part 11 opposite to the first surface 111, or may be disposed in the inside of the light guide part 11. Also, the three-dimensional effect forming part 12 is not limited to being formed on the first surface of the light guide part 11 only, and the three-dimensional effect forming part 12 may be disposed on both the first surface and the second surface. When a first pattern and a second pattern, which are at least partially overlappingly disposed, are arranged at both sides of the light guide part 12, various optical images may be implemented by relatively high condensing efficiency generated from an overlapping region compared to a non-overlapping region.

FIG. 2 is a cross-sectional view of a lighting device according to another embodiment of the present disclosure.

Referring to FIG. 2, a lighting device 10A according to the present embodiment includes: a light guide part 11; a three-dimensional effect forming part 12; a light source part 13; a housing 14; and a driving part 15.

The light guide part 11 has a bent portion 113. The bent portion 113 may be a portion which is fixedly bent, or may be a portion which is temporarily bent by a fixed driving means. In the present embodiment, the bent portion 113 is a specific portion of the light guide part 11 which is temporarily bent by the driving part 15.

The three-dimensional effect forming part 12 guides an incident beam, which is irradiated from a light source 132 of the light source part 13 disposed in an inner side of the housing 14 to a second surface of the light guide part 11, in an arrangement direction of multiple unit patterns, and then guides the beam in a thickness direction of the light guide part 11 or in a first surface direction and a second surface direction through refraction and reflection generated from each inclined surface of the unit patterns, thereby creating line-shaped beams of first paths that cross at right angles to each pattern extension direction.

The line-shaped beams of the first path refer to an optical image having a line or band shape in which the line-shaped beams extend in a direction (first path) crossing at right angles to each pattern extension of the multiple unit patterns resulting from indirect light source effects of the sequentially arranged multiple unit patterns generated by reflection or refraction from each inclined surface of the unit patterns in pattern areas through which incident beams passes directly. Furthermore, the line-shaped beams refer to an optical image that looks as if the line-shaped beams are positioned far away gradually from a standard point of an observation point according to an increase of a light movement distance in the first paths, the optical image having a perceptional depth or a three-dimensional effect that is gradually formed toward a thickness of the light guide part 11 or a direction appropriately vertical to the first surface of the multiple unit patterns or the pattern arrangement surface.

The light source part 13 may include a substrate 131 and an LED light source 132 and may be substantially identical to the light source part previously described with reference to FIG. 1.

The housing 14 supports an optical member composed of the light guide part 11 and the three-dimensional effect forming part 12, and the light source part 13 irradiating light to the optical member. The housing 14 may be disposed to receive the light source part 13 or to surround the light source part 13.

According to some embodiments, the housing 14 may be replaced by various support members. The support member may be a part of the housing of the lighting device, an inside or outside wall of a building, or a part of a specific product or a device. Also, the support member may be implemented using at least one part of a desktop computer body, a monitor frame, a desk, a chair, a portable terminal (a smart phone, a smart pad, etc.), a cap, clothing, a shoe, a bag, an accessory, indoor or outdoor interior parts, and the like.

The driving part 15 is connected to the housing 14 and the optical member so that the optical member can be inclined or bent. The driving part 15 may be implemented so as to reduce or extend a length of a first connection means (a wire and the like) connecting the housing 14 and the optical member. By reducing the length of the connection means according to winding of a bolt, the driving part 15 may be implemented so that the bent portion 113 can be formed in the optical member, or may be implemented so that the bent portion 113 of the optical member can be flattened by a restoring force of a second connection means (a spring and the like) and releasing of a bolt, and thus the optical member can be returned in a flat state.

In addition to the bolt structure, the driving part 15 may be implemented with an electric motor, and a control unit controlling the electric motor. In this case, the control unit may be a control unit of an application product (lighting equipment, a vehicle lamp, and the like), or may be a separate control unit which can be connected to the application product. The control unit of the driving part 15 may be provided with a driving circuit for driving the light source part 13, and a single module.

Meanwhile, the lighting device 10A according to the present embodiment may further include a bent supporting part 16 for supporting the bent portion 113. The bent supporting part 16 may be connected to the housing 14 and may be provided in a rod or pillar-like shape in a space between the substrate 131 and the light guide part 11. Thus, the bent supporting part 16 may be disposed so as to support the bent portion 113 near to the second surface of the light guide part 11.

According to the present embodiment, the line-shaped beams of the first paths may be bent by the three-dimensional effect forming part 12 having the bent portion 113 so that line-shaped beams, three-dimensional beams, or line-shaped beams with a three-dimensional effect having various desired images can be implemented. Also, when a position of the light source is fixed, the bent portion 113 is formed in the optical member using the driving part 14 so that various line-shaped beams or three-dimensional beams can be more effectively implemented.

FIG. 3 is an exemplary view showing an optical image of the lighting device of FIG. 2.

As illustrated in FIG. 3, the lighting device 10A according the present embodiment is configured such that the three-dimensional effect forming part 12 has one bent portion 113, and the light source part 13 irradiates light from approximately an intermediate portion of the light guide part to a thickness direction of the light guide part so that the light irradiated from the light guide part can extend from the intermediate portion to each edge of both sides, thereby expressing line-shaped beams with a three-dimensional effect.

Twelve beams emitted from the LED light source form incident beams irradiated to an intermediate region A1 of the three-dimensional effect forming part 12 of the light guide part 11 according to overlapping of twelve semicircular regions overlap based on a light emitting surface of the LED light source. The intermediate region of the three-dimensional effect forming part 12 refers to a first region A1 corresponding to an intermediate portion in an arrangement direction of the multiple unit patterns disposed at the light guide part 11. When an incident beam is irradiated to the first region A1, the three-dimensional effect forming part 12 of the lighting device 10A guides movement of the incident beam within the light guide part using the multiple unit patterns and implements line-shaped beam images in multiple lines traveling from the first region A1 to a third region A3 through a second region A2.

In particular, in the present embodiment, since the optical images are changed at the bent portion 113 of the light guide part 11, the lighting device having different optical images at both sides with the intermediate portion as the center can be implemented.

The optical images described above are generated by the patterns of the three-dimensional effect forming part that are sequentially arranged and have each pattern extension direction extending from a first side to a second side opposite to the first side, and crossing at right angles to a lengthwise direction based on the lengthwise direction extending between the first side and the second side. Here, the reason why the line-shaped beams extending to the lengthwise direction are expressed as twelve line-shaped beams with a stripe form that are grouped into four groups, each group being composed of three line-shaped beams is because the LED light source has a structure in which four LED packages having three LED elements are disposed in a line, or twelve LED elements disposed in an arrangement similar to such an arrangement are used in the LED light source. Of course, in addition to the method in which twelve LED elements are used, the twelve line-shaped beams may be implemented in such a manner that twelve incident beams is irradiated to the light guide part through the LED elements of a smaller number than the number of the twelve LED elements. Moreover, the LED elements, which irradiate beams having the same color or beams having different colors, may be used.

Thanks to the aforesaid configuration, a first line-shaped beam traveling from the intermediate portion, to which the incident beam is irradiated, to the first side, and a second line-shaped beam traveling from the intermediate portion to the second side may be implemented by converting the incident beams irradiated from the intermediate portion of the light guide part. Also, the lighting device 10A according to the present embodiment may implement various optical images with a three-dimensional effect by reducing a variation in intensity of the line-shaped beams, or changing a length of the line-shaped beams through the bent portion 113.

FIG. 4 is a cross-sectional view of a lighting device according to still another embodiment of the present disclosure, and FIG. 5 is an exemplary view showing an optical image of the lighting device of FIG. 4.

Referring to FIG. 4, a lighting device 10B according to the present embodiment includes: a light guide part 11; a three-dimensional effect forming part 12 disposed on the light guide part 11; and a light source part 13 irradiating light to an intermediate portion of the light guide part 11. A combination of the light guide part 11 and the three-dimensional effect forming part 12 may be referred to as an optical member. The optical member has a bent portion 113 provided in a first region Al.

The light guide part 11, the three-dimensional effect forming part 12, and the light source part 13 may substantially identical to the corresponding constitutive elements of the lighting device previously described with reference to FIG. 1 or 3 except for the bent portion 113. According to some embodiments, the light source part 13 may include a plurality of light sources 132 disposed to be separated from each other.

The bent portion 113 is provided in the first region A1 located at the intermediate portion of the light guide part 11 to which the light of the light source 132 of the light source part 13 is directly irradiated. The bent portion 113 may be a part of the light guide part 11 disposed to be nearest to the light source 132. An optical image of the lighting device using the bent portion 113 is shown in FIG. 5.

As illustrated in FIG. 5, as the lighting device 10B according to the present embodiment is configured such that the bent portion is provided by bending the intermediate portion of the optical member, and the bent portion is disposed to be nearest to the light source, when the incident beam is irradiated to the bent portion, the lighting device may implement optical images spreading in a wing-like shape at both sides of the intermediate portion using line-shaped beams having a three dimensional effect and traveling from the bent portion corresponding to the intermediate portion of the light guide part to the both sides of the light guide part.

Meanwhile, the lighting device 10B according to the present embodiment may further include a housing, a driving part, and the like. In this case, the lighting device 10B may be substantially to the lighting device 10A previously described with reference to FIGS. 2 and 3 except for the position of the bent portion, and the fact that the light of the light source is directly irradiated to the bent portion.

FIG. 6 is a cross-sectional view of a lighting device according to still anther embodiment of the present disclosure. FIG. 7 is an exemplary view showing an optical image of the lighting device of FIG. 6.

Referring to FIG. 6, a lighting device 10C according to the present embodiment includes: a light guide part 11; a three-dimensional effect forming part 12 disposed on the light guide part 11; and a light source part 13 irradiating light to an intermediate portion of the light guide part 11. A combination of the light guide part 11 and the three-dimensional effect forming part 12 may be referred to as an optical member. The optical member may include at least one bent portion 113 disposed at the outside of a first region to which the light of the light source part 13 is directly irradiated.

The light guide part 11, the three-dimensional effect forming part 12, and the light source part 13 may be substantially identical to the corresponding constitutive elements of the lighting device previously described with reference to FIGS. 1 to 5 except for the fact that the first region of the light guide part 11 is disposed to be inclined with respect to the light source 132, and two bent portions 113 are provided at both sides of the first region.

The bent portion 113 is provided in the outside of the first region to which the light of the light source 132 is directly irradiated, namely, in a second region to which the light of the light source 132 is not directly irradiated. The first region (see A1 of FIG. 4) is a region of the light source part 11 to which the light of the light source is directly irradiated. In the present embodiment, the intermediate portion of the optical member corresponding to the first region is arranged as an inclined surface with a fixed inclination angle with respect to a printed circuit board 131 or a light emitting surface of the light source 132. The bent portion 113 includes a first bent portion located at an upper side and a second bent portion located at a lower side, wherein the first bent portion and the second bent portion are provided at both side edges, respectively. The first bent portion 113 located at the upper side is a bent portion located to be farther away from the printed circuit board 131 or the light source 132 compared to the second bent portion located at the lower side.

In this case, the both side edges of the optical member between which the first bent portion, the first region, and the second bent portion 113 are disposed may be arranged parallel to the printed circuit board 131 or the light emitting surface of the light source 132. The printed circuit board 131 may be a flexible printed circuit board.

According to the lighting device 10C of the present embodiment, an optical image implemented using line-shaped beams with a three-dimensional effect is shown as one example in FIG. 7.

As illustrated in FIG. 7, the lighting device 10C according to the present embodiment is configured such that the bent portion is provided by bending both side edges of the intermediate portion of the optical member in different directions, and the intermediate portion is then disposed to be inclined with respect to the light source. Thus, when the light of the light source is directly irradiated to the intermediate portion, the lighting device may implement an optical image in which multiple line-shaped beams spread in a flame-like shape from the first region corresponding to the inclined intermediate portion toward the first bent portion 113 located to the upper side, and the multiple line-shaped beams extend in a short length to the second bent portion located at the lower side of the first region.

Meanwhile, the lighting device 10C according to the present embodiment may further include a housing, a driving part, and the like. In this case, the lighting device 10C may be substantially to the lighting device previously described with reference with FIGS. 2 and 3 except for each position of the two bent portions on the optical member, and the fact that the light of the light source is directly irradiated to the inclined intermediate portion between the two bent portions.

FIG. 8 is a partial perspective view of a lighting device according to still another embodiment of the present disclosure. FIG. 9 is a partially cross-sectional view taken along line IX-IX of the lighting device of FIG. 8. FIG. 10 is a cross-sectional view illustrated for explaining an operating principle of the lighting device of FIG. 8. FIG. 10 corresponds to a case in which the optical member of FIG. 9 is disposed in a state of being overturned.

Referring to FIGS. 8 and 9, a lighting device 10D according to the present embodiment includes: a light guide part 11 with a flat plate or film form; a three-dimensional effect forming part 12 having multiple unit patterns sequentially arranged on one surface of the light guide part 11 in a y-direction; and a light guide source part irradiating light to an intermediate portion of the light guide part 11.

The light source part (see reference numeral 13 of FIG. 1) may include an LED light source that irradiates a single incident beam BL with a fixed width from a direction crossing at right angles to an x-y plane to the light guide part 11. A width of the single incident beam BL in an x-direction may be similar to an entire width of the light guide part 12 in a pattern extension direction of one unit pattern.

The light guide part 11 may be substantially identical the light guide part previously described with reference to FIG. 1 except for a pattern structure of the three-dimensional effect forming part 12.

The three-dimensional effect forming part 12 includes multiple unit patterns 121*a*, 121*b*, 121*c*, 121*d* of four groups provided in different regions of the light guide part 11. The three-dimensional effect forming part 12 has a spaced part 17 among the respective patterns of the four groups.

More specifically, the unit patterns 121a, 121b, 121c, or 121d of each group of the three-dimensional effect forming part 12 may have a form in which multiple prism rod-like unit patterns each having a first surface, a second surface, and a third surface is sequentially arranged in a line. The unit patterns of each group may have a prism rod form in which a lengthwise direction of the unit patterns extends in an x-direction, and may also have an uneven form in which a first surface of the unit patterns comes into contact with one surface of the light guide part 11, and a second surface and a third surface of the unit patterns are repeatedly arranged with a second surface and a third surface of the adjacent other unit patterns.

The patterns 121a, 121b, 121c, 121d of four groups may be integrally formed with the light guide part 11 by processing one surface of the light guide part 11. When the first surface of the unit patterns of each pattern is a surface resulting from arranging the unit patterns to be parallel to one surface of the light guide part 11, the first surface becomes an imaginary surface that integrally comes into contact with the light guide part 11.

The second surface and the third surface of the unit patterns are inclined surfaces each having a fixed inclination angle with respect to the first surface or the second surface of the light guide part 11. The second surface and the third surface of the unit patterns are surfaces each having an inclination angle and inclined on one surface of the light guide part 11, so that line-shaped beams can be implemented by guiding an incident beam passing through the light guide part 11 to first paths through refraction and reflection from the inclined surfaces.

That is, the incident beam traveling in the inside of the light guide part 11 and refracted and reflected from the inclined surfaces of the unit patterns extends from a first region A1 to a third region A3 via a second region A2, and is emitted in a first surface direction or a second surface direction of the light guide part 11. At this time, the beam is converted into line-shaped beams of the first paths by an arrangement direction of the multiple unit patterns and an effect of the indirect light source.

In order to ensure a reflection or refraction property beyond a fixed value from the patterns of the three-dimensional effect forming part 12, each inclined surface of the unit patterns is provided as a shiny or smooth mirror surface. A surface roughness Rz of the mirror surface may be measured and calculated based on a ten-point median height roughness using a difference between an average height of five highest peaks and an average deep of five deepest valleys in the curve of a section for a reflective surface. The surface roughness may be designed in a range of about 0.8 μm or less, preferably, 0.4 μm or less, more preferably 0.1 μm or less with regard to a standard length of 0.25 mm. When the surface roughness is more than a fixed value (e.g., 0.8 μm), a desired reflection or refraction property of each pattern is reduced below a certain level, and accordingly, it may be difficult to properly implement a desired optical image.

Each of the spaced parts 17 extends in a direction parallel to a direction to which the line-shaped beams of the first paths travel, and is provided in a region between the adjacent patterns of two groups, namely, the region in which the patterns are not formed. That is, the spaced part 17 may extend from the first surface of the light guide part 11 to a y-direction and may have a fixed width. This spaced part 17 may be simultaneously formed with the patterns 121a, 121b, 121c, 121d of the three-dimensional effect forming part 12 during the process for forming the patterns of the multiple groups of the three-dimensional effect forming part 12 by processing one surface of the light guide part 11.

In a case where the spaced part 17 is used, when a beam having a single width is irradiated from a direction crossing at right angles to or crossing a thickness direction (z-direction) of the light guide part 11 to an x-direction of an intermediate portion of the second surface of the light guide part 11, the patterns of the multiple groups may convert an incident beam entered into the light guide part 11 into four pairs of line-shaped beams, which are expressed in a state of being separated from each other. The four pairs of line-shaped beams refer to multiple line-shaped beams traveling in a +y direction and a −y direction, respectively based on appropriately an intermediate portion of the y-direction of the light guide part 11.

The line-shaped beams with a three-dimensional effect will be described in greater detail as follows.

Referring to FIG. 10, the incident beams entered into the first region A1 corresponding to the intermediate portion of the light guide part 11 are reflected from the inside of the light guide part 11 and travel from one side to the other side. At this time, the pattern 121 of the three-dimensional effect forming part 12 disposed on one surface of the light guide part 11 changes each traveling direction of the incident beams by refracting or reflecting the incident beams so that the incident beams can be emitted in a first surface direction toward which the first surface 111 of the light guide part 11 looks, or in a second surface direction toward which the second surface opposite to the first surface looks.

Here, the multiple unit patterns, which are sequentially arranged, serve as indirect light sources in which each optical path is gradually increased from the first region A1 to the third region A3 by reflection and refraction of the incident beam. Accordingly, a first incident beam traveling from the intermediate portion of the light guide part 11 to a first side edge, and a second incident beam traveling from the intermediate portion to a second side edge are converted into line-shaped beams emitted to the outside of the light guide part 11 through the indirect light sources having a point light source form and sequentially arranged to have a length of the optical path which is gradually increased from the first region A1 to the third region A3 by reflection and refraction from each inclined surface of the unit patterns. The line-shaped beams become indirect light sources which are positioned farther away from a reference point or an observation point of the outside according to an increase in the length of the optical path, and are expressed as three-dimensional line-shaped beams having a perceptional depth in their traveling directions.

In other words, when it is measured that a first indirect light source resulting from a first unit pattern located in the first region A1 of the light guide part 11 is positioned at a first distance L1 from the first unit pattern, it is observed that a second indirect light source LS2 resulting from a second unit pattern located in the second region A2 is positioned at a second distance L2 which is longer than the first distance L1, and that a third indirect light source LS3 resulting from a third unit pattern located in the third region A3 is positioned at a third distance L3 which is longer than the second distance L2. Furthermore, according to a difference in optical paths resulting from the same light sources, the intensity of light (luminosity) of the second indirect light source LS2 is smaller than that of the first indirect light source LS1 and is larger than that of the third indirect light source LS3.

According to the aforesaid configuration, the lighting device 10D may implement optical images using three dimensional line-shaped beams from a standard point of the outside, the three dimensional line-shaped beams showing an increase in distance vector components and a reduction in luminance reduces in a direction of the pattern arrangement surface (first surface) of the light guide part 11, or in a direction crossing at right angles to the first surface 112.

Also, according to the present embodiment, when the bent portion is disposed at the optical member formed by the light guide part 11 and the three-dimensional effect forming part 12, the lighting device 10D may implement optical images having various shape as the lighting device previously described with reference to FIG. 2, 4 or 6.

FIG. 11 is a perspective view of a lighting device according to still another embodiment of the present disclosure.

Referring to FIG. 11, a lighting device 10E according to the present embodiment of the disclosure includes: a light guide part 11; a three-dimensional effect forming part 12; and a light source part. The three-dimensional effect forming part 12 includes patterns of multiple groups which are sequentially arranged in different regions of the light guide part in a y-direction, and barrier ribs 18 formed between the adjacent pattern groups and extending in the y-direction of the light guide part 11.

When a beam is irradiated from a thickness direction (z-direction) of the light guide part 11 or an inclined direction with respect to the thickness direction to an intermediate portion of a y-direction of the light guide part 11, the lighting device 10E according the present embodiment of the disclosure may convert the beam into four pairs of line-shaped beam extending in each pattern arrangement direction of the pattern groups of the three-dimensional effect forming part 12 by refracting and reflecting the beam inside the light guide part 11 through patterns of four groups.

The three-dimensional effect forming part 12 may be provided by removing a part of one surface of the light guide part 11, but is not limited thereto. The three-dimensional effect forming part may be provided by bonding of a separate pattern layer having multiple patterns on one surface of the light guide part 11. In this case, a refractive index of the pattern layer may be designed to be identical to that of the light guide part 11 or to have a fixed difference (about 0.2 or less) in refractive indexes with the light guide part 11.

Each pattern group of the three-dimensional effect forming part 12 includes unit patterns 121a, 121b, 121c, 121d in a semicylindrical rod form. Each of the unit patterns of each pattern group have a rod form having a semicircumferential surface or a plane surface facing the semicircumferential surface. Here, the plane surfaces of the semicylindrical rod may be arranged to come into contact with one surface of the light guide part, and the semicircumferential surfaces may be sequentially arranged in parallel to the y-direction.

Each of the barrier walls 18 is a portion in which the patterns of the three-dimensional effect forming part 12 are not provided. This portion may be provided as one portion of the light guide part 11, or may be provided by disposing a separate member between the adjacent pattern groups. The barrier walls 18 may be made of a material having a different refractive index, color, and the like from those of the three-dimensional effect forming part 12. When these barrier walls 18 are used, the single incident beam may be split and expressed in multiple line-shaped beams.

According to the present embodiment, when a beam is irradiated from a thickness direction of the light guide part or an inclined direction with respect to the thickness to an intermediate portion of one direction of the light guide part, by guiding the incident beams inside the light guide part in a first surface direction or a second direction of the light guide part through sequential reflection and refraction from each inclined surface of the unit patterns, multiple line-shaped beams of first paths crossing at right angles to each pattern arrangement direction of the unit patterns may be implemented. The multiple line-shaped beams include at least one pair of line-shaped beam traveling from the intermediate portion of the light guide part in both sides of the intermediate portion.

Also, according to the present embodiment, when a bent portion is disposed in an optical member composed of the light guide part 11 and the three-dimensional effect forming part 12, like the lighting device previously described with reference to FIG. 2, 4 or 6, the lighting device 10E may implement optical images having various shapes.

FIG. 12 is a perspective view of a lighting device according to still another embodiment of the present disclosure.

Referring to FIG. 12, a lighting device 10F according to the present embodiment includes: a light guide part 11; a three-dimensional effect forming part 12; and a light source part.

The three-dimensional effect forming part 12 has the patterns that extend in an x-direction of the light guide part 11 and are sequentially arranged in a y-direction. That is, in the lighting device 10F according to the present embodiment, the three-dimensional effect forming part 12 includes multiple unit patterns 121 of a single group that are not divided into unit patterns of multiple groups by a spaced part or barrier rib, and have no spaced part or barrier rib extending from an intermediate portion of a patter extension direction to each pattern arrangement direction.

The lighting device 10F of the present embodiment may be identical to the lighting device previously described with reference to FIG. 8 or 11 except for a pattern structure of the three-dimensional effect forming part 12. Thus, the detailed description of the same or similar constitutive elements is omitted.

In the present embodiment, each of the unit patterns 121 of the three-dimensional effect forming part 12 has a quadrangular rod form or a trapezoidal section form having a first surface 1211, a second surface 1212, a third surface 1213, and a fourth surface 1214. The multiple unit patterns 121 on one surface of the light guide part 11 are placed to have a lengthwise direction toward an x-direction (pattern extension direction), and are sequentially arranged in a y-direction.

With regard to each of the unit patterns 121, the first surface 1211 may be arranged parallel to the first surface or the second surface of the light guide part 11. The second surface 1213 may be parallel to or may not be parallel to the first surface 1211. The third surface 1212 and the fourth surface 1214 may be inclined surfaces inclined at a fixed inclination angle with respect to the first surface 1211.

When the third surface 1213 is disposed to be parallel to the second surface of the light guide part 11 or the pattern arrangement surface, the third surface 1213 may not serve as an indirect light source in the three-dimensional effect forming part 12, and may be a portion that cuts off the line-shaped beams (hereinafter referred to as 'disconnection part'). This disconnection part may be appropriately used when an optical image is implemented as line-shaped beams in a dotted line form. When continual line-shaped beams are implemented, the disconnection part is set to have a thickness of about 10 μm.

When the third surface 1213 is not parallel to the pattern arrangement surface of the light guide part 11, and is disposed to have a fixed inclination angle with respect to the pattern arrangement surface of the light guide part 11, the third surface 1213 may be an inclined surface that refracts and reflects the incident beams with the second surface 1212 or the fourth surface 1214 and guides the incident beams in a first surface direction or a second surface direction.

The lighting device 10F according to the present embodiment may include a light source having a plurality of LED elements arranged in an x-direction and irradiating multiple beams to an intermediate portion of a y-direction. In this case, the lighting device 10F may implement optical images including multiple pairs of line-shaped beams with a three-dimensional effect traveling from the intermediate portion of the y-direction to both sides using the unit patterns of the three-dimensional effect forming part 12 as the lighting device of FIG. 8 or 11.

Meanwhile, the lighting device 10F including the multiple unit patterns 121 according to the present embodiment has a structure in which each pattern extension direction of the multiple unit patterns 121 extends in an x-direction parallel to each other, but is not limited thereto. For example, in a modified example, the lighting device 10F may include multiple unit patterns designed such that a width of the section of at least one unit pattern is gradually increased from one end of the x-direction of the unit pattern to the other end so that an optical path is curved or is bent based on a fixed point of one end of the x-direction.

According to the present embodiment, when a beam is irradiated from a thickness direction of the light guide part or an inclined direction with respect to the thickness direction to an intermediate portion of one direction of the light guide part, by guiding the incident beams inside the light guide part into a first surface direction or a second surface direction of the light guide part by sequential reflection and refraction from each inclined surface of the unit patterns, the multiple line-shaped beams of the first paths parallel to each other and extending in a direction crossing at right angles to each pattern extension direction of the unit patterns may be implemented.

Also, according to the present embodiment, when a bent portion disposed in an optical member composed of the light guide part 11 and the three-dimensional effect forming part 12, like the lighting device illustrated in FIG. 2, 4 or 6, optical images having various shapes may be implemented by multiple pairs of line-shaped beams.

FIG. 13 is a plan view of a lighting device according to still another embodiment of the present disclosure.

Referring to FIG. 13, a lighting device 10G according to the present embodiment includes: a light guide part 11; first to third three-dimensional effect forming parts 12a, 12b, 12c ; first to third light source parts 20a, 20b, 20c; and an outer lens 30.

The light guide part 11 is provided in a fixed vehicle lamp form when viewed from a plane or a front surface. Here, the vehicle lamp may be any one of a headlight, a backlight, an indoor light, a door scuff, a fog lamp, and the like without being limited thereto. The light guide part 11 may be identical to the light guide part of FIG. 1, 8, 11, or 12 except for a shape or form thereof.

The first three-dimensional effect forming part 12a is provided in a first region of the light guide part 11. The multiple unit patterns 121a of the first three-dimensional effect forming part 12a extend from the first region to a first A direction and are sequentially arranged in a first B direction crossing the first A direction or crossing at right angles to the first A direction. Each of the unit patterns 121a has an inclined surface having a first inclination angle with respect to a pattern arrangement surface of the light guide part 11 in the first B direction.

The second three-dimensional effect forming part 12b is provided in a second region of the light guide part 11. The second region does not overlap with the first region. The multiple unit patterns 121b of the second three-dimensional effect forming part 12b extend from the second region to a second A direction and are sequentially arranged in a second B direction crossing the second A direction or crossing at right angles to the second A direction. The second A direction may not be parallel to the first A direction, and the second B direction may not be parallel to the first B direction. Each of the unit patterns 121b has an inclined surface having a second inclination angle with respect to a pattern arrangement surface of the of the light guide part 11 in the second 2B direction. The second inclination angle may be identical to or different from the first inclination angle.

The third three-dimensional effect forming part 12c is provided in a third region of the light guide part 11. The third region does not overlap with the first region and the second region. The multiple unit patterns 121c of the third three-dimensional effect forming part 12c extend from the third region to a third A direction, and are sequentially arranged in a third B direction crossing the third A direction or crossing at right angles to the third A direction. The third A direction may not be parallel to the first A direction or the second A direction, and the third B direction may not be parallel to the first 1B direction or the second B direction. Each of the unit patterns 121c has an inclined surface having a third inclination angle with respect to a pattern arrangement surface of the light guide part 11 in the third B direction. The third inclination angle may be identical to at least any one of the first inclination angle and the second inclination angle, or may be different from both the first inclination angle and the second inclination angle.

A first light source part 132a is disposed to irradiate light to an intermediate portion of the first region. The first region of the light guide part 11 may be inclined or bent with respect to the first light source part 132a (see FIGS. 7 and 9). A second light source part 132b is disposed to irradiate light to an intermediate portion of the second region. The second region of the light guide part 11 may be inclined or bent with respect to the second light source part 132b. Furthermore, a third light source part 132c is disposed to irradiate light to an intermediate portion of the third region. The third region of the light guide part 11 may be inclined or bent with respect to the third light source part 132b.

The first to third light source parts 132a, 132b, 132c may have a light source supported on one surface of an outer lens 30 by a housing of the light device 10G to which the outer lens 30 is connected. Here, at least any one light source of the first to third light source parts 132a, 132b, 132c may be provided using at least one optical module with a three-dimensional effect along with the light guide part 11 and the three-dimensional effect forming part. Furthermore, at least one optical member composed of at least any one of the first to third three-dimensional effect forming parts 12a, 12b, 12c, and at least one portion of the light guide part 11 may be bonded to one surface of the outer lens 30, or may be disposed on one surface of the outer lens 30. When the lighting device is implemented as a vehicle lamp, the respective light source parts may be connected to a vehicle battery 19 and may be operated by power of the vehicle battery.

When the first to third light source part 132a, 132b, 132c have a flexible printed circuit board, and the light guide part 11 is formed with a resin layer, the lighting device 10G may be bonded to one surface of the outer lens 20 having a curved surface, or may be disposed to be bent while having at least one inflection point along a curved surface of the outer lens 20.

According to the aforesaid configuration, the beams of the respective light source parts 132a, 132b, 132c are irradiated from a thickness direction of the light guide part 11 or a direction inclined with respect to the thickness direction to each intermediate portion of the regions of the light guide parts, the unit patterns 121a, 121b, 121c of the three-dimensional effect forming part express line-shaped beams GL by guiding and limiting the incident beams in both directions of the pattern arrangement direction. Of course, the third to third three-dimensional effect forming parts may implement line-shaped beams extending in one direction rather than both directions of a pattern arrangement direction according to a relative arrangement design with the light source.

Also, in the lighting device 10G according to the present embodiment, at least one of a first optical member provide with the light guide part 11 and the first three-dimensional effect forming part 12a, a second optical member provided with the light guide part 11 and the second three-dimensional effect forming part 12b, and a third optical member provided with the light guide part 11 and the third three-dimensional effect forming part 12c may be bent to have a curvature or a curved surface. In this case, the lighting device 10G may implement optical images of various line-shaped beams using the bent portion as the lighting device of FIG. 2, 4, or 6. Moreover, in addition the vehicle lamp, the lighting device 10G according to the present embodiment may be easily used in a general indoor and outdoor lighting device, a lighting device having a design used in an exhibition and the like, a flexible application production, and the like.

FIGS. 14 to 16 are exemplary views showing patterns which can be adopted to the lighting device of the present disclosure.

Referring to FIG. 14, the three-dimensional effect forming part 12 of the lighting device according to the present embodiment has a pattern, wherein the pattern has multiple unit patterns 121. Each of the unit patterns 121 has a triangular section form.

When each of the unit patterns 121 has the triangular section form, each inclined surface 123 of the unit patterns 121 has a fixed inclination angle with respect to the first surface or a pattern arrangement surface (see reference numeral 111 of FIG. 1). In other words, the inclined surface 123 may have an inclination angle θ inclined with respect to the z-direction that crosses at right angles to the pattern arrangement surface.

The inclination angle θ is larger than about 5° and smaller than 85°. The inclination angle θ may be further limited in consideration of a refractive index of the light guide part. However, when considering reflection and refraction from the inclined surface 123 beyond a certain level, the inclination angle θ may be appropriately designed in a range of about 5° to about 85°.

When a refractive index of the light guide part is about 1.30 to about 1.80, the inclination angle of the inclined surface of one side of the unit pattern 121 may be larger than 33.7° and smaller than 50.3°, or may be larger than 49.7° and smaller than 56.3° according to each standard direction (the z-direction or the y-direction).

Also, the optical member formed with the light guide part and the multiple unit patterns may be provided using a material having a high-refractive index. For example, in the case of manufacturing high intensity LEDs, when a ray of light having a specific incidence angle penetrates a capsule material by passing along a semiconductor die, total internal reflection is performed due to a difference in an n value (a refractive index) between the semiconductor die (n=2.50~3.50) and a general polymeric capsule element (n=1.40~1.60), and accordingly, light extraction efficiency of the device is reduced. Thus, in order to properly solve this problem, a high refractive index polymer (n=1.80~2.50) is used. In the present embodiment, the optical member may be provided by utilizing the high refractive index polymer (n=1.80~2.50) used in manufacturing high intensity LEDs. In this case, the inclination angle of the inclined surface 123 of each unit pattern 121 may be larger than 23.6° and smaller than about 56.3°, or may be larger than 33.7° and smaller than 66.4° according to each refractive index of the optical member.

Also, according to some embodiments, in order to adjust a refractive index, at least one functional layer having a high refractive index may be coated on the multiple unit patterns.

An inclination angle according to the refractive index may be represented by following Equation 1 according to the Snell's law.

$$\frac{\sin\theta_1}{\sin\theta_2} = \frac{n2}{n1} \quad \text{[Equation 1]}$$

In Equation 1, sin θ1 is a traveling angle or an incidence angle of light shown in a first medium of a first refractive index n1, and sin θ2 is an incidence angle or a traveling angle of light shown in a second medium of a second refractive index n2.

As previously described, the inclined surface of each of the multiple unit patterns in the present embodiment may be provided to have an inclination angle θ ranging from about 5° to about 85° as an inclination angle which enables an incident beam to be reflected or refracted appropriately. In one embodiment, in addition to the inclination angle of the inclined surface, each of the unit patterns 121 may be configured such that a rate of a width w to a height h is limited to a fixed rate for convenience of a production process. The width of each bottom surface of the unit patterns may correspond to a cycle or a pitch of each unit pattern.

For example, when the patterns of the three-dimensional effect forming part are designed so that a three-dimensional effect of the line-shaped beams can be emphasized, the width w of each of the patterns 121 may be provided to be identical to or smaller than a height h of each of the unit patterns. Also, when the patterns of the three-dimensional effect forming part are designed so that the line-shaped beams can express relatively long images, the width w of each of the unit patterns may be provided to be larger than the height h of each of the unit patterns. Also, when each of the multiple pattern 121 has a lenticular form, a rate (h/w) of a width (or a diameter) to a height of each of the multiple patterns 121 may be about ½ or less. At this time, an inclination angle θ of each inclined surface of the unit patterns may be about 45° or less.

As such, in the present embodiment, by using the width w and the height h of each unit pattern as factors for property adjustment, optical images of the line shaped beams or the three-dimensional effect beam having desired designs may be efficiently controlled.

According to the present embodiment, the width w (which may correspond to a pitch) between two adjacent unit patterns in the three-dimensional effect forming portion 21 may be 10 to 500 µm. This width w may refer to an average distance between the multiple patterns of the first paths, and may be adjusted according to each pattern design or each desired shape of optical images.

Referring to FIG. 15, when designing the pattern of the three-dimensional effect forming part 12 of the lighting device according to the present embodiment, each of the multiple unit patterns may be provided to have a semicircular or semielliptical section form. Each unit pattern 121 has an inclined surface inclined at a fixed angle in a thickness direction (z-direction) of the light guide part or a y-direction. The unit patterns 121 may have a symmetrical form based on a center line (not drawn) in a z-direction, but the present disclosure is not limited thereto.

In the present embodiment, the inclined surface of each unit pattern 121 may be considered as an imaginary inclined surface on a circumscribed straight line with regard to a semicircular sectional structure of the unit patterns. The inclined surface may have an inclination angle θ that is changed along a semicircular external surface and is larger than larger than 0° and smaller than 90°. That is, since each inclined surface of the unit patterns 121 is an inclined surface that comes in contact with an arbitrary point and has appropriately a semicircular arc shape, the inclined surface may have the inclination angle θ which is an acute angle.

Also, the three-dimensional effect forming part 12 of the present embodiment may include a spaced part 102 provided between the adjacent unit patterns. That is, when the multiple unit patterns include a first pattern Cm−1, a second pattern Cm and a third pattern Cm+1 (wherein, m is a natural number of 2 or more), the three-dimensional effect forming portion 12 may include spaced parts 102 provided between the first pattern Cm−1 and the second pattern Cm, and between the second pattern Cm and the third pattern Cm+1.

Each of the spaced parts 102 may be a part of the first surface 111 positioned between two adjacent patterns as a part of the first surface 111 of the light guide part in which the unit patterns are not formed. Also, the spaced part may be provided for convenience of a manufacturing process as a gap between two adjacent patterns. The spaced parts 102 may be omitted according to a manufacturing process or a pattern design of specific implementation.

A second width w1 of the spaced part 102 is smaller than a first width w of the unit pattern 121. The second width w1 of the spaced part 102 is may be about ⅕ or less or several µm or less of the first width w of the unit pattern 121. At this time, a cycle or a pitch of the unit patterns may correspond to a value resulting from adding the first width w and the second width W1.

Referring to FIG. 16, when designing patterns of the three-dimensional forming part 12 of the lighting device according to the present embodiment, the unit patterns 121 may have a polygonal section form. Each of the inclined surfaces of the unit patterns 121 may have a broken-line graph-like shape.

In the present embodiment, each of the inclined surfaces 123 of the unit patterns 121 may be provided so as to have multiple inclination angles θ1, θ2 according to the number of segments of the broken-line graph in the direction (z-direction) crossing at right angles to the first surface of the light guide part. The second inclination angle θ2 may be larger than the first inclination angle θ1. The first and second inclination angles θ1, θ2 may be designed within the range of the inclination angle which is larger than about 5° and smaller than about 85°.

Also, the three-dimensional effect forming part 12 of the present embodiment may further include the spaced part 102 between two adjacent unit patterns. A width w1 of the spaced part 102 is smaller than the width w of each of the unit patterns so that natural line-shaped beams can be implemented via the three-dimensional forming part 12. The width w1 of the spaced portion 102 may be designed in several µm or less. The width w1 of the spaced part 102 may be designed to be narrow maximally or the spaced part 102 may be omitted.

Also, the three-dimensional effect forming part 12 may have a disconnection surface 125 parallel to the first surface 111 on the unit patterns 121. The disconnection surface 125 is a part which does not function to enable an incident beam to be substantially emitted to the outside through the reflection or refraction of the incident beam. Thus, since line-shaped beams implemented by the multiple unit patterns may be disconnected at a portion corresponding to the disconnection surface 125, a width w2 of the disconnection surface 125 may be appropriately designed in a range of several µm or less so that line-shaped beams having a desired shape can be implemented.

As set forth above, according to some embodiments of the present disclosure, as an optical path and an optical width are controlled by a pattern design, and an arrangement structure of patterns and a light sources is designed, the lighting device in a flexible sheet form may implement optical images having a three-dimensional effect by irradiating a beam to the intermediate portion of the light guide part having patterns, or by irradiating a beam to the intermediate portion of the light guide part disposed to be inclined.

Also, according to some embodiments of the present disclosure, as a lighting device having a flexible structure on a sheet, the lighting device may be efficiently applied to a flat surface or a curved portion of an inner or outer side of an object targeted for installing illumination such as a building, equipment, furniture, vehicle, and the like.

In other words, according to some embodiments of the present disclosure, the lighting device may implement optical images of line-shaped beams having a three-dimensional effect and various forms according to a relative position of the light sources and patterns, or an inclination or curvature of the light guide part. Furthermore, thanks to a flexible sheet-shaped structure, the lighting device may be easily applied to a curved portion of an inner or outer side, or a bent portion of an object targeted for installing illumination such as a building, equipment, furniture, vehicle, and the like. Also, as a vehicle lamp (a headlight, a backlight, a fog light, an indoor light, a door scuff, and the like), the lighting device for a vehicle having a flexible sheet form may be advantageous in various aspects, such as a volume, a thickness, a weight, a price, a lifespan, stability, the degree of freedom in design, installation easiness, and the like.

As previously described, in the detailed description of the disclosure, having described the detailed exemplary embodiments of the disclosure, it should be apparent that modifications and variations can be made by persons skilled without deviating from the spirit or scope of the disclosure. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents.

An aspect of embodiments of the present disclosure may provide a lighting device capable of implementing an optical image having a three-dimensional effect and a desired form by controlling an optical path and an optical width through a pattern design and an arrangement structure of a pattern and a light source.

Another aspect of embodiments of the present disclosure may provide a lighting device capable of implementing an optical image having a three-dimensional effect through a pattern design and an arrangement structure of a pattern and a light source, and capable of having a flexible sheet form.

According to an aspect of the embodiments of the present disclosure, a lighting device may include: a light guide part having a first surface and a second surface opposite to the first surface; a three-dimensional effect forming part on the light guide part; and a light source part irradiating a beam from a thickness direction of the light guide part to an intermediate portion of the light guide part, wherein the three-dimensional effect forming part comprises a pattern having multiple unit patterns that are sequentially arranged and have inclined surfaces each having an inclination angle with respect to the first surface or the second surface, wherein the multiple unit patterns of the pattern guide incident beams in the light guide part into a first surface direction toward which the first surface looks, or into a second surface direction toward which the second surface looks through reflection and refraction from the inclined surfaces, thereby implementing line-shaped beams of first paths crossing at right angles to each pattern extension direction of the multiple unit patterns.

In one embodiment, the multiple unit patterns may include a first unit pattern, a second unit pattern, and a third unit pattern that are sequentially arranged and have a first distance corresponding to the nearest distance to a first region in which a beam of a light source of the light source part is incident from an outer portion of the light guide part into an inner portion, a second distance which is longer than the first distance, and a third distance which is longer than the second distance, respectively, wherein the second distance between a second dummy light source resulting from an inclined surface of the second unit pattern, and the inclined surface of the second unit pattern is longer than the first distance between a first dummy light source resulting from an inclined surface of the first unit pattern, and the inclined surface of the first unit pattern, and is shorter than the third distance between a third dummy light source resulting from an inclined surface of the third unit pattern, and the inclined surface of the third unit pattern.

In one embodiment, the pattern may convert the incident beams into a first line-shaped beam extending from an intermediate portion of the light guide part to a first side edge, and a second line-shaped beam extending from the intermediate portion to a second side edge facing the first side edge.

The inclined surface may include a mirror surface or a mirror-like finishing surface.

The inclined surface may have an arithmetic mean roughness (Ra) of 0.02 or less and a maximum height roughness (Ry) of 0.30 or less.

A cycle or a pitch of the multiple unit patterns may range from 10 to 500 m.

The pattern extension directions of the multiple unit patterns may be parallel to each other.

The light guide part may include a bent portion bent in its thickness direction.

The bent portion may be arranged in a first region in which a beam of the light source part is incident from an outer portion of the light guide part to an inner portion.

The bent portion may be arranged at an outer portion of the first region in which the beam of the light source part is incident from the outer portion of the light guide part to the inner portion.

A material of the light guide part may include resin or glass, wherein the resin includes a thermoplastic polymer or a photo curable polymer.

The three-dimensional effect forming part may be integrally formed with the light guide part by processing at least one of the first surface and the second surface of the light guide part.

The three-dimensional effect forming part may be provided using a pattern layer bonded to at least one of the first surface and the second surface of the light guide part.

The three-dimensional effect forming part may include multiple unit patterns of a first group provided in different regions of the light guide part, and multiple unit patterns of a second group.

A first pattern extension direction of at least one of the multiple unit patterns of the first group may be different from a second pattern extension direction of at least one of the multiple unit patterns of the second group.

The lighting device may further include a pattern disconnection portion or a barrier rib between the multiple patterns of the first group and the multiple patterns of the second group.

The light source part may include a first light source irradiating an incident beam to the multiple unit patterns of the first group, and a second light source irradiating an incident beam to the multiple unit patterns of the second group.

The first light source and the second light source may be LED packages each having at least one LED (Light Emitting Diode) element.

The lighting device may further include a housing supporting the light source part or the light guide part.

The lighting device may further include a driving part connected to the housing and intended for enabling the light guide part to be inclined or to be bent.

The lighting device may further include an outer lens covering the light guide part.

The light source part may be connected to a vehicle battery.

According to another aspect of the embodiments of the present disclosure, a lighting device may include: a light guide part having a first surface and a second surface opposite to the first surface; a three-dimensional effect forming part on the light guide part; and a light source part irradiating a beam from a direction inclined with respect to the first surface or the second surface to the light guide part, wherein the three-dimensional effect forming part comprises a pattern having multiple unit patterns that are sequentially arranged and have inclined surfaces each having an inclination angle with respect to the first surface or the second surface, wherein the multiple unit patterns of the pattern guide incident beams in the light guide part into a first surface direction toward which the first surface looks, or into a second surface direction toward which the second surface looks through reflection and refraction from the inclined surfaces, thereby implementing line-shaped beams of first paths crossing at right angles to each pattern extension direction of the multiple unit patterns.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
   a substrate;
   a plurality of light sources disposed on the substrate;
   a light guide member spaced away from the plurality of light sources, and having a first portion, a second portion and a third portion; and
   a plurality of unit patterns disposed on the light guide member,
   wherein the first portion is positioned at a first distance from the upper surface of the substrate, the third portion is positioned at a second distance from the upper surface of the substrate, the second distance being greater than the first distance, and the second portion is disposed between the first portion and the third portion,
   wherein the second portion of the light guide member is inclined with respect to the upper surface of substrate to form an acute angle, and at least a first one of the unit patterns is disposed on the first portion of the light guide member, at least a second one of the unit patterns is disposed on the second portion of the light guide member, and at least a third one of the unit patterns is disposed on the third portion of the light guide member.

2. The lighting device of claim 1, wherein the second portion becomes closer to the substrate from the third portion toward the first portion.

3. The lighting device of claim 1, wherein a total number of the light sources overlapping with the second portion in a vertical direction is greater than a total number of the light sources overlapping with the first portion and the third portion in the vertical direction.

4. The lighting device of claim 1, wherein the first portion and the third portion are parallel to the upper surface of the substrate.

5. The lighting device of claim 1, wherein a material of the light guide member includes a resin having a thermoplastic polymer or a photo curable polymer, or glass.

6. The lighting device of claim 1, wherein the plurality of unit patterns are integrally formed with the light guide member by processing one main surface of the light guide member.

7. The lighting device of claim 1, wherein the light guide member further comprises:
   a first bending portion between the second portion and the third portion; and
   a second bending portion between the second portion and the first portion.

8. The lighting device of claim 1, further comprising a housing that supports the substrate, the plurality of light sources and the light guide member.

9. The lighting device of claim 1, wherein the substrate is a flexible printed circuit board.

10. The lighting device of claim 1, wherein a cycle or a pitch of the plurality of unit patterns ranges from 10 to 500 µm.

11. The lighting device of claim 1, wherein extension directions of the plurality of unit patterns are parallel to each other.

12. The lighting device of claim 1, wherein the plurality of light sources are aligned on the substrate in a first direction, and
   the first portion of the light guide member is aligned over a first part of the substrate in a second direction perpendicular to the first direction,
   the second portion of the light guide member is aligned over a second part of the substrate in the second direction, and
   the third portion of the light guide member is aligned over a third part of the substrate in the second direction.

13. The lighting device of claim 1, wherein the light guide member comprises a first surface facing the plurality of light sources and a second surface opposite to the first surface,
   wherein the plurality of unit patterns are disposed on the second surface of the light guide member,
   wherein light emitted from the plurality of light sources passes through at least the first one of the unit patterns, at least the second one of the unit patterns, and at least the third one of the unit patterns.

14. The lighting device of claim 13, wherein the plurality of unit patterns are configured to convert light emitted from the light sources into line shaped beams.

15. The lighting device of claim 1, further comprising a spaced part disposed between the plurality of unit patterns.

16. The lighting device of claim 15, wherein a spaced part comprises a flat portion.

17. The lighting device of claim 15, wherein a width of the spaced part is smaller than a width of the plurality of unit patterns.

* * * * *